United States Patent
Park

(10) Patent No.: US 7,230,661 B2
(45) Date of Patent: Jun. 12, 2007

(54) DISPLAY DEVICE HAVING AN ADDITIONAL LIGHT SOURCE UNIT

(75) Inventor: Chan Young Park, Seoul (KR)

(73) Assignee: LG Electronics Inc., Seoul (KR)

( * ) Notice: Subject to any disclaimer, the term of this patent is extended or adjusted under 35 U.S.C. 154(b) by 157 days.

(21) Appl. No.: 10/833,278

(22) Filed: Apr. 28, 2004

(65) Prior Publication Data
US 2004/0228147 A1 Nov. 18, 2004

(30) Foreign Application Priority Data
Apr. 29, 2003 (KR) ...................... 10-2003-0027198

(51) Int. Cl.
G02F 1/1335 (2006.01)
A47F 3/00 (2006.01)
(52) U.S. Cl. .............................. 349/61; 349/5; 362/561
(58) Field of Classification Search .................... 349/5, 349/61; 362/561; 353/31
See application file for complete search history.

(56) References Cited

U.S. PATENT DOCUMENTS

| | | | | |
|---|---|---|---|---|
| 6,439,724 B1 * | 8/2002 | Jeon et al. ..................... | 353/31 |
| 6,561,654 B2 * | 5/2003 | Mukawa et al. ............... | 353/31 |
| 6,585,386 B1 * | 7/2003 | Yano et al. .................. | 362/614 |
| 6,877,865 B2 * | 4/2005 | English, Jr. et al. .......... | 353/97 |
| 2002/0033931 A1 * | 3/2002 | Knox ........................... | 353/31 |
| 2004/0263500 A1 * | 12/2004 | Sakata ........................ | 345/204 |
| 2005/0013132 A1 * | 1/2005 | Kim et al. ................... | 362/231 |

FOREIGN PATENT DOCUMENTS

JP 2000-305040 11/2000
KR 10-2003-0006203 1/2003

* cited by examiner

Primary Examiner—Mike Qi
(74) Attorney, Agent, or Firm—Ked & Associates, LLP

(57) ABSTRACT

A display device is disclosed. The display device includes a lamp emitting light, a plurality of filters dividing the emitted light into a red light, a green light, and a blue light, an additional light source unit compensating a light having a lowest light intensity among the divided red, green, and blue light, and a red liquid crystal display, a green liquid crystal display, and a blue liquid crystal displaying an image by using the light emitted from the lamp and the light emitted from the additional light source unit.

5 Claims, 5 Drawing Sheets

DISPLAY DEVICE HAVING AN ADDITIONAL LIGHT SOURCE UNIT

CROSS-REFERENCE TO RELATED APPLICATIONS

This application claims the benefit of Korean Application No. P2003-027198, filed on Apr. 29, 2003, which is hereby incorporated by reference as if fully set forth herein.

BACKGROUND OF THE INVENTION

1. Field of the Invention

The present invention relates to a display device, and more particularly, to a display device using a supplementary light source for enhancing brightness.

2. Discussion of the Related Art

As satellite broadcasting and digital broadcasting are being extensively introduced and provided, the demand and interest for wide screen displays are increasing, and with such increase, the expectations on projectors and their importance as a display device are also on the rise. Accordingly, many technologies for high luminance projectors are recently being developed.

For example, a liquid crystal display (LCD) projector divides a light emitted from a lamp, which is used as a light source herein, by using a plurality of color filters and combines the divided colors so as to represent a color image. However, in this case, there lies a problem in that a light intensity rate of each of the colors of red, green, and blue, which form the color image, should be controlled in accordance with the specific characteristic of the lamp.

In other words, in a spectrum of the lamp used in the LCD projector, the green region has the highest light intensity, whereas the blue region and the red region have relatively low light intensities. More specifically, due to the low light intensity of the blue region, which has the lowest luminosity factor, the brightness shown from the projector is seen to be relatively weak through the eyes of a viewer. Such phenomenon results in a decrease in the brightness of the LCD projector.

Therefore, in the related art LCD projector, in order to represent a color image corresponding to an input video signal, the light intensities of the red and green regions should be reduced in accordance with that of the blue region, which has the lowest light intensity, thereby controlling the white balance.

As described above, the related art LCD projector does not use all of the light emitted from the lamp. Instead, the related art LCD projector should control the color combination rate of red, green, and blue based on the color having the lowest light intensity, thereby causing the problem of decreasing the brightness of the entire screen.

SUMMARY OF THE INVENTION

Accordingly, the present invention is directed to a display device that substantially obviates one or more problems due to limitations and disadvantages of the related art.

An object of the present invention is to provide a display device that uses an additional light source to enhance the brightness of a displayed color image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device includes a lamp emitting light, a plurality of filters dividing the emitted light into a red light, a green light, and a blue light, an additional light source unit compensating a light having a lowest light intensity among the divided red, green, and blue light, and a red liquid crystal display, a green liquid crystal display, and a blue liquid crystal displaying an image by using the light emitted from the lamp and the light emitted from the additional light source unit.

Herein, the additional light source unit includes a supplementary light source, and a lightguide with mirror combining the light emitted from the supplementary light source and the light emitted from the lamp, and transmitting the combined light to the liquid crystal display. And, the supplementary light source is formed of a light emitting diode.

Also, the lightguide with mirror includes a light incident surface having the light emitted from the supplementary light source incident thereon, an inclined surface inclined at a predetermined angle from the light incident surface, and reflecting the light incident on the light incident surface, and a reflective surface reflecting the light reflected from the inclined surface to a direction identical to the light emitted from the lamp.

Herein, an inclination angle of the inclined surface of the lightguide with mirror can be controlled in accordance with the direction of the light emitted from the lamp.

In another aspect of the present invention, a display device includes a lamp emitting light, a plurality of filters dividing the emitted light into a red light, a green light, and a blue light, a supplementary light source compensating a light having a lowest light intensity among the divided red, green, and blue light, a plurality of polarizers polarizing the light emitted from one of the lamp and the supplementary light source, and a red liquid crystal display, a green liquid crystal display, and a blue liquid crystal displaying an image by using the light transmitted through the polarizer.

Herein, the polarizer includes a first polarizing unit polarizing the light emitted from the lamp, and a second polarizing unit polarizing the light emitted from the light emitting diode array.

The polarizer further includes a third polarizing unit selectively transmitting or reflecting the light transmitted through the first and second polarizing units depending upon the direction factor of the transmitting light, and a fourth polarizing unit polarizing the light transmitted or reflected by the third polarizing unit.

The polarizing unit is a polarizing beam splitter, wherein the polarizing beam splitter is formed of a plurality of micro polarizing beam splitters. Herein, the polarizing beam splitter includes alternately formed half-wave plates.

The supplementary light source is formed of a light emitting diode array.

And, the light emitting diode array includes a half-wave plate formed at an end portion of each light emitting diode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
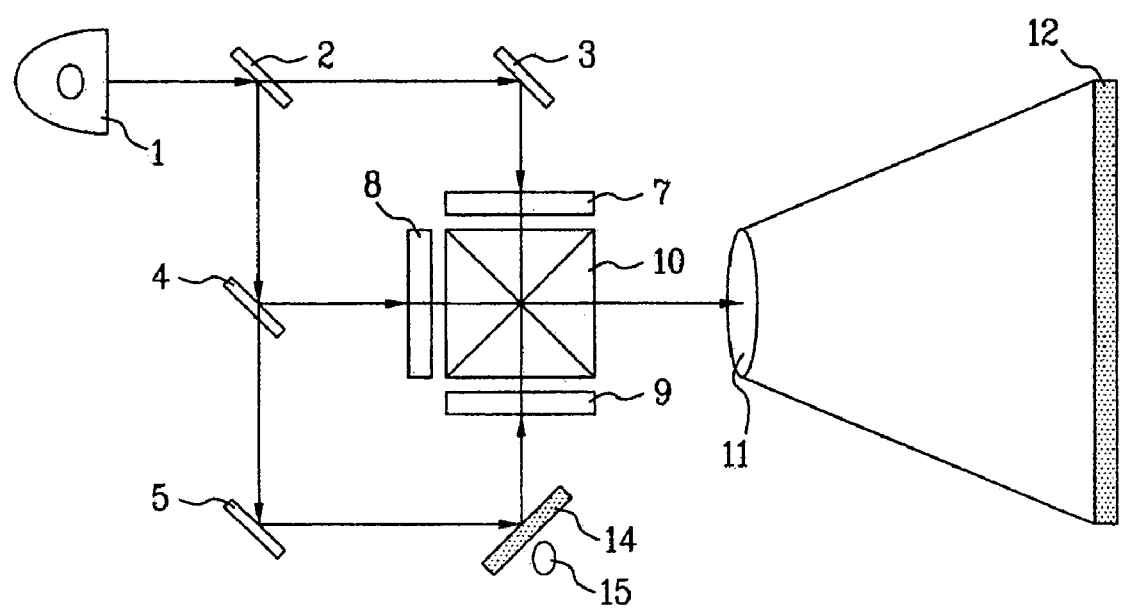
FIG. 1 illustrates block diagram showing a structure of a display device according to a first embodiment of the present invention.

FIG. 1 illustrates block diagram showing a structure of a display device according to a first embodiment of the present invention.

Referring to FIG. 1, the display device includes a lamp being a light source, and red and blue filters 2 and 4 dividing the light and transmitting only the light of the corresponding color. The display device also includes red and blue mirrors 3 and 5 reflecting the light of the corresponding color, a light emitting diode (LED) 15 used as a supplementary light source, and a lightguide with mirror 14 combining and transmitting the light emitted from the LED 15 and the light emitted from the light source.

In addition, the display device according to the present invention further includes red, green, and blue liquid crystal displays (LCDs) 7, 8, and 9 displaying images of the corresponding colors based on electrical signals, a prism 10 combining the images displayed by the LCDs and processing the images to a constant direction, a projection optical part 11 enlarging the combined image, and a screen 12 displaying the enlarged image.

The operations of the display device according to the present invention having the above-described structure will now be described in detail.

The light generated from the lamp 1 is passed forward towards the front surface through a reflector. Among the light passed forward, only the red light is transmitted by the red filter 2, whereas the green light and the blue light are reflected.

Subsequently, the transmitted red light is reflected by the red mirror 3, which is then irradiated to the red LCD 7. Meanwhile, the blue filter transmits the blue light reflected by the red filter 2 and reflects the green light. The reflected green light is then irradiated to the green LCD 8.

In addition, after the blue light transmitted through the blue filter 4 is reflected by the blue mirror 5, the lightguide with mirror 14 changes the path of the reflected blue light, which is then irradiated to the blue LCD 9.

Figure 2:
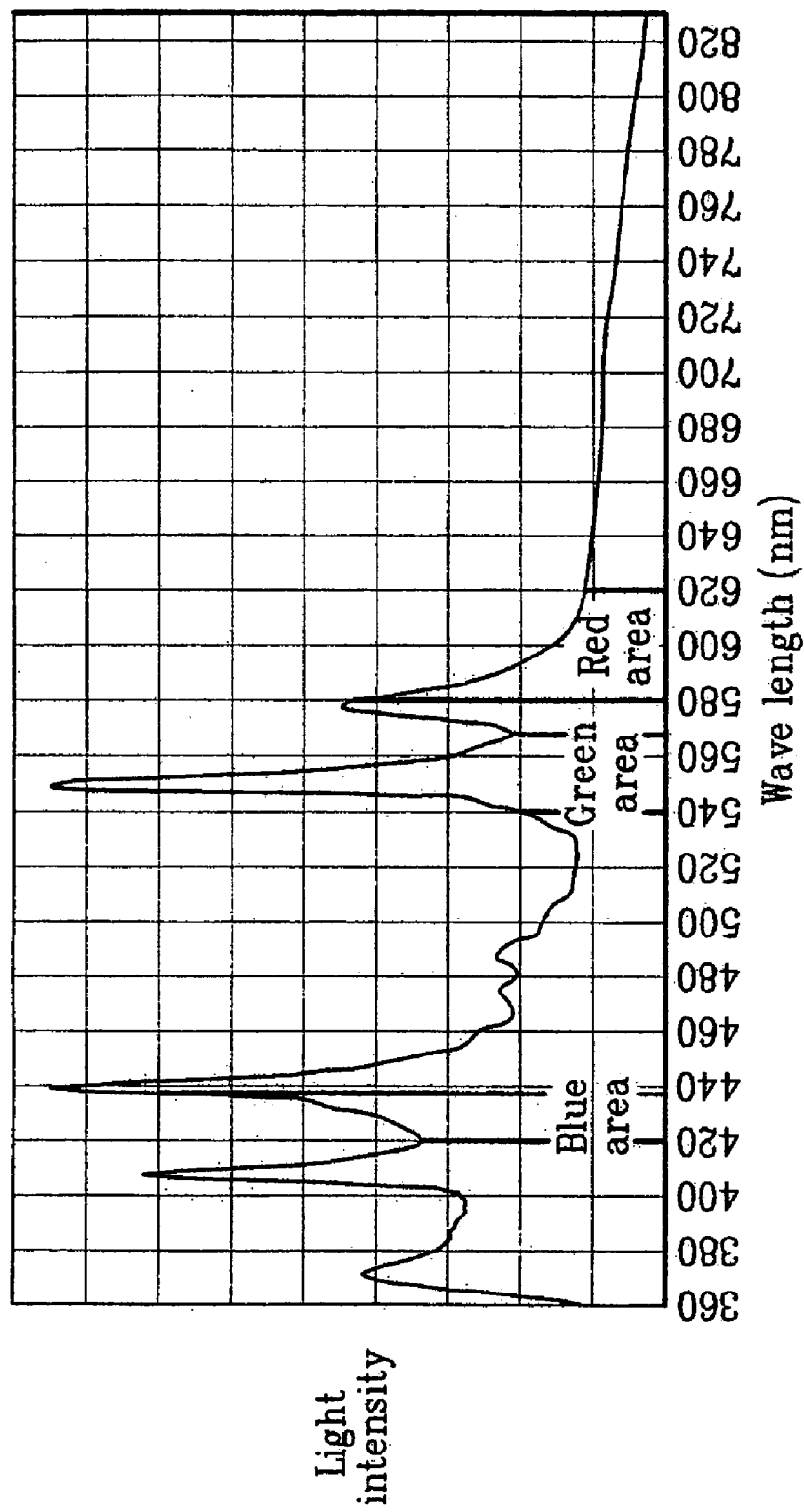
FIG. 2 illustrates a graph showing a light intensity spectrum of a general lamp.

FIG. 2 illustrates a graph showing a light intensity spectrum of a general lamp.

Generally, as shown in FIG. 2, in a spectrum of the lamp used in the LCD projector, the light intensity of the green region is the highest, and the light intensities of the red and blue regions are relatively low. More specifically, the luminosity factor of the blue region is the lowest, which causes the blue region to become the darkest region.

In other words, in order to correctly display a color image with the adequate colors, the light intensity of the color having the lowest light intensity should be increased.

Accordingly, the light emitting diode (LED) 15 emitting blue light is formed on a side of the lightguide with mirror 14 as a supplementary light source. The blue light emitted from the LED 15 is reflected by the lightguide with mirror 14 and then irradiated to the blue LCD 9. Similarly, the blue light emitted from the lamp and the blue light generated from the LED 15 are combined, and then irradiated to the blue LCD 9.

Figure 3A:
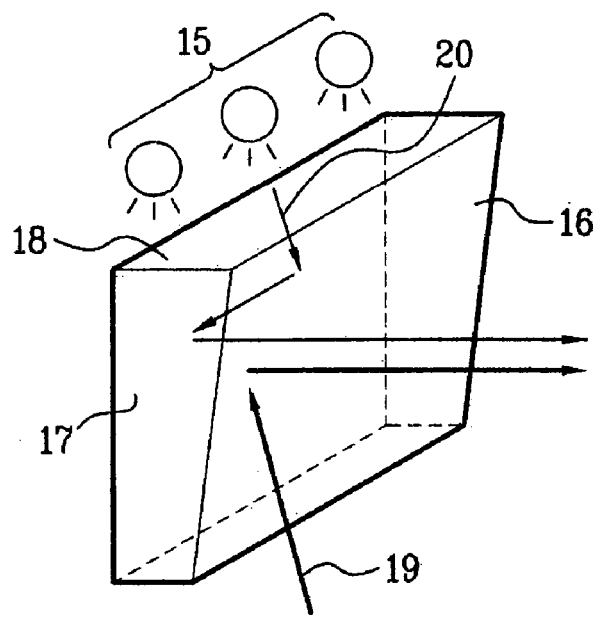
FIGS. 3A and 3B illustrate a detailed view showing the principle of a lightguide with mirror of the display device according to the first embodiment of the present invention.
Figure 3B:
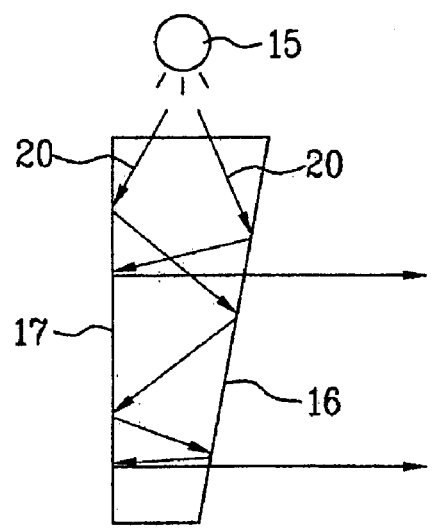

FIGS. 3A and 3B illustrate a detailed view showing the principle of a lightguide with mirror of the display device according to the first embodiment of the present invention.

Referring to FIGS. 3A and 3B, the lightguide with mirror 14 is formed of an inclined surface 16, a reflective surface 17, and a light incident surface 18. The light generated from the LED 15 is incident on the light incident surface 18.

The blue light 19 reflected by the blue mirror 5 is passed through to be parallel to the optical path of the lamp, and the blue light 19 is then reflected to the inclined surface 16 of the lightguide with mirror 14.

Meanwhile, the blue light emitted from the LED 15 is incident on the light incident surface 18 of the lightguide with mirror 14. Thereafter, the blue light is totally reflected from the inclined surface 16, and the totally reflected light is reflected once again from the reflective surface 17 to be parallel to the optical path of the lamp.

At this point, when the inclination angle of the inclined surface 16 is controlled, the direction of the blue light generated from the LED 15 can be parallel to the blue light emitted from the lamp.

Herein, the lightguide with mirror 14 can be formed in various shapes, such as a right triangle, a parallelogram, a semi-circle, and so on.

As described above, by increasing the light intensity of the blue light, each of the red, green, and blue lights emitted from the lamp can be used without any loss.

Figure 4:
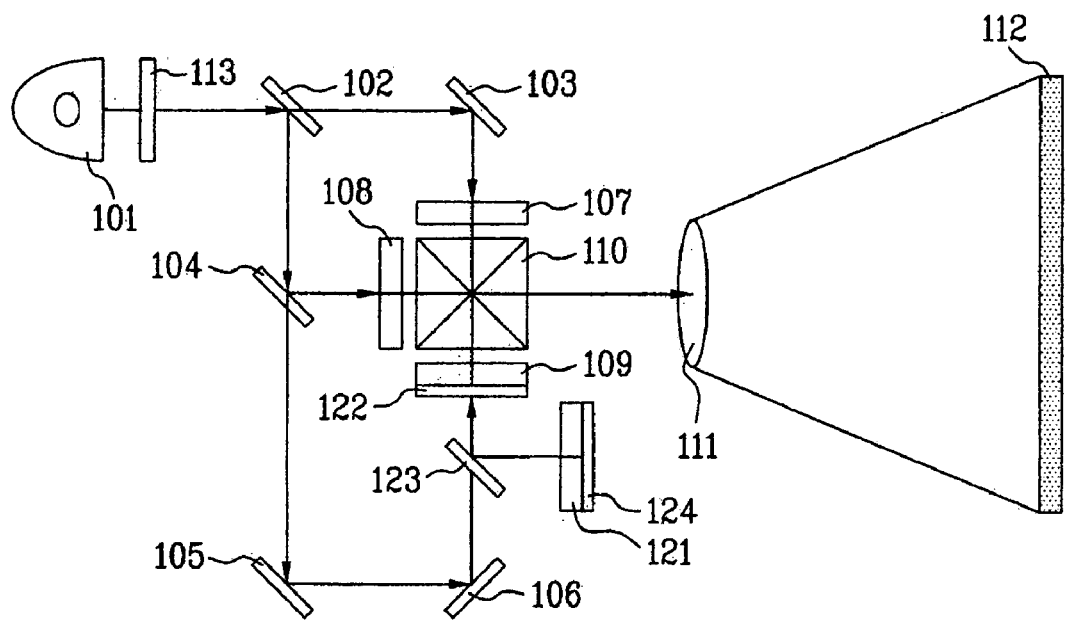
FIG. 4 illustrates a block diagram of a display device according to a second embodiment of the present invention.
Figure 5:
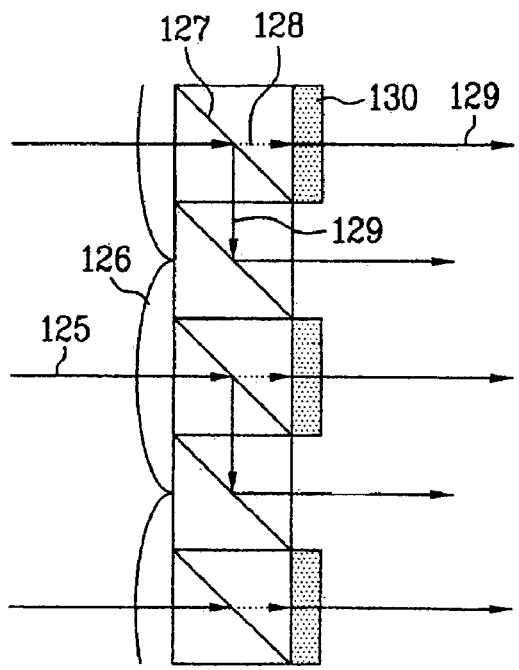
FIG. 5 illustrates the principle of a polarizing beam splitter of the display device according to the second embodiment of the present invention.

FIG. 4 illustrates a block diagram of a display device according to a second embodiment of the present invention. And, FIG. 5 illustrates the principle of a polarizing beam splitter of the display device according to the second embodiment of the present invention.

Referring to FIG. 4, the display device according to the second embodiment of the present invention includes a lamp 101 being a light source, a first micro polarizing beam splitter 113 changing the light emitted from the lamp into a constant polarized light, a red filter 102, a blue filter 104, a red mirror 103, and first and second blue mirrors 105 and 106.

The display device also includes a light emitting diode (LED) array 124 acting as a supplementary light source, and a second micro polarizing beam splitter 121 changing the light emitted from the LED array 124 into a constant polarized light.

Additionally, the display device further includes a third micro polarizing beam splitter 123 selectively reflecting and transmitting the polarized lights passing through the first and second polarizing beam splitters 113 and 121, a fourth micro polarizing beam splitter changing the reflected and transmitted polarized lights into a single polarized light, a red liquid crystal display 107, a green liquid crystal display 108, and a blue liquid crystal display 109, a prism 110, an projection optical part 111, and a screen 112.

The light emitted from the lamp is reflected by the reflector and passed forwards towards the front surface. Thereafter, the first polarizing beam splitter 113 changes the light into a constant polarized light.

The principle of the polarizing beam splitter will now be described with reference to FIG. 5.

The light 125 emitted from the lamp 101 and incident on the polarizing beam splitter includes a combination of P-waves and S-waves.

The incident light 125 is focused to a coating surface 127 of the polarizing beam splitter by a micro lens 126. Among the incident light 125, the P-wave light 128 is transmitted and passes through the coating surface 127 of the polarizing beam splitter. The polarizing direction of the P-wave light 128 is then rotated by 90 degrees (90°) by a half-wave plate 130, so as to be changed into the S-wave light 129.

Meanwhile, among the incident light 125, the S-wave light 129 is reflected by the coating surface 127 of the polarizing beam splitter, which is then reflected once again by the coating surface of an adjacent polarizing beam splitter in a direction parallel to the P-wave light.

As described above, all of the light incident on the micro polarizing beam splitter 113 is changed into S-wave light.

On the other hand, when the half-wave plates 130 are positioned at the front surface of the coating material of the even-numbered polarizing beam splitters, as opposed to FIG. 5, the incident light can all be changed into P-wave light.

Referring to FIG. 4, among the polarized light formed by the first polarizing beam splitter, the red filter 102 transmits only the red light and reflects the green light and the blue light. Subsequently, the transmitted red light is reflected by the red mirror 103, which is then irradiated on the red liquid crystal display (LCD) 107.

Meanwhile, among the light reflected by the red filter 102, the blue light is transmitted by the blue filter 104, and the green light is reflected. The reflected green light is irradiated on the green LCD 108.

In addition, the blue light transmitted through the blue filter 104 is sequentially reflected by the first blue mirror 105 and the second blue mirror 106. The reflected blue light then passes through in the same direction as the blue LCD 109.

As described above, in order to accurately represent the color image, the light intensity of the color blue having the lowest light intensity should be increased.

Therefore, the display device of the present invention uses a flat light emitting diode (LED) 124 as a supplementary light source of the blue light.

Figure 6:
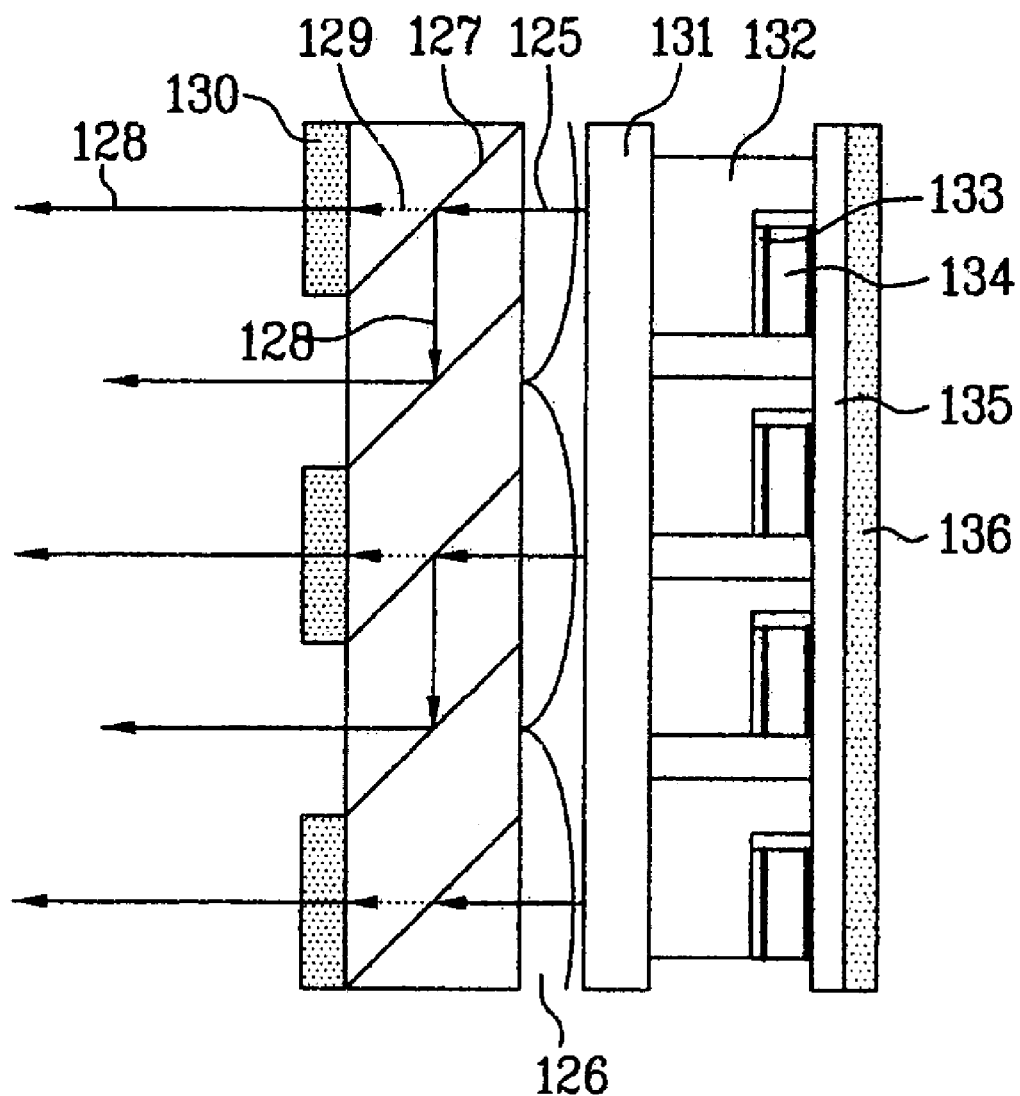
FIG. 6 illustrates a block diagram of a light emitting diode according to the second embodiment of the present invention.

FIG. 6 illustrates a block diagram of a light emitting diode according to the second embodiment of the present invention.

Referring to FIG. 6, an LED p-layer 132 and an LED n-layer 134 are serially deposited on the substrate 131. Then, an LED emission layer 133 is formed between the LED p-layer 132 and the LED n-layer 134. And, each of the LED p-layer 132 and the LED n-layer is adjacent to an indium tin oxide (ITO) layer 135, which is a transparent electrode.

The ITO layer 135 receives an external electrical signal so as to apply a voltage to the LED p-layer 132 and the LED n-layer 134, thereby generating light from the LED emission layer 133.

Herein, the light passes through in both directions of the emission layer 133. However, since the light passing through the right side of the emission layer 133 is reflected to the left side by the reflective surface 136, the entire light is passed through to the left side of the emission layer 133.

Subsequently, after the light is transmitted through the LED substrate 131, the micro lens 126 focuses the transmitted light to the coating surface 127 of the second micro polarizing beam splitter. Herein, the coating surface 127 is formed to transmit a wave having a constant vibration direction and to reflect a wave that does not have a constant vibration direction.

For example, after being transmitted through the coating surface 127 of the polarizing beam, the direction of the polarized light of the S-wave light 129 is rotated by 90 degrees (90°) by the half-wave plate 130, so as to be modified to a P-wave light 128. Meanwhile, the P-wave light 128 is reflected downwards in a perpendicular direction at 90 degrees (90°) by the coating surface 127 of the polarizing beam splitter, which is then reflected once again towards the left side in a horizontal direction at 90 degrees (90°) by the coating surface 127 of an adjacent polarizing beam splitter.

Similarly, the light emitted from the LED is polarized as a P-wave light 128 by the second micro polarizing beam splitter 121.

In other words, the first micro polarizing beam splitter 113 polarizes the light emitted from the lamp as a S-wave, and the second micro polarizing beam splitter 121 polarized the light emitted from the LED as a P-wave.

Referring back to FIG. 4, the S-wave blue light emitted from the lamp and the P-wave blue light emitted from the LED are combined at the third micro polarizing beam splitter 123, so as to be passed through towards the blue LCD.

The third micro polarizing beam splitter 123 is controlled to transmit the S-wave light and to reflect the P-wave light, as shown in FIG. 4. Thereafter, the S-wave blue light emitted from the lamp is transmitted through the third micro polarizing beam splitter 123, and the P-wave blue light emitted from the LED is reflected by the third micro polarizing beam splitter 123.

The combined blue light is then polarized as one of a P-wave and a S-wave by the fourth micro polarizing beam splitter 122, so as to be irradiated to the blue LCD. Accordingly, the light intensity of the blue light irradiated to the blue LCD can be increased.

Meanwhile, the direction of the final polarized light passing through the fourth micro polarizing beam splitter is set to have the polarizing direction of the LCD, thereby enhancing the light efficiency of the LCD.

Subsequently, due to an electrical signal, each of the red LCD 107, the green LCD 108, and the blue LCD 109 displays an image of the corresponding color. Then, the images displayed from each of the red, green, and blue LCDs are combined at the prism 110, so as to form a single color image.

The projection optical part enlarges the color image and projects the enlarged color image to the screen. The viewer is then able to view the displayed image in front of or from behind the screen.

However, when the light intensity of other colors other than the color of blue is relatively lower, depending upon the characteristics of the lamp, the supplementary light source corresponding to the color having the lowest light intensity can be used instead.

The above-described display device according to the present invention has the following advantages.

By using a light emitting diode (LED), the color having the lowest light intensity among the R, G, and B lights emitted from the lamp being the light source can be compensated, thereby increasing the brightness of the screen without any light loss by color regions.

Moreover, the polarizing beam splitter polarizes the light emitted from the lamp as a constant polarized light, thereby enhancing the optical efficiency of the LCD.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device, comprising:
    a lamp emitting light;
    a plurality of filters dividing the emitted light by wavelength;
    an additional light source unit compensating a light having a lowest light intensity among the divided light; and
    a plurality of liquid crystal displays displaying an image by using the light emitted from the lamp and the light emitted from the additional light source unit, wherein the additional light source unit comprises:
        a supplementary light source; and
        a lightguide with mirror combining the light emitted from the supplementary light source and the light emitted from the lamp, and transmitting the combined light to the plurality of liquid crystal displays, wherein the lightguide with minor comprises:
            a light incident surface having the light emitted from the supplementary light source incident thereon;
            an inclined surface inclined at a predetermined angle from the light incident surface, and reflecting the light incident on the light incident surface; and
            a reflective surface reflecting the light reflected from the inclined surface to a direction identical to the light emitted from the lamp.

2. The device according to claim 1, wherein the supplementary light source is formed of a light emitting diode.

3. The device according to claim 1, wherein an inclination angle of the inclined surface of the lightguide with mirror is set in accordance with the direction of the light emitted from the lamp.

4. The device according to claim 1, wherein the emitted light is divided into a red light, a green light, and a blue light.

5. The device according to claim 1, wherein the plurality of liquid crystal displays comprises a red liquid crystal display, a green liquid crystal display, and a blue liquid crystal display.

* * * * *